United States Patent Office 3,288,841
Patented Nov. 29, 1966

3,288,841
DIPHENOL DI-ESTERS OF (2-PROPYNYLOXY) BENZOIC ACIDS
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,755
3 Claims. (Cl. 260—474)

The compounds of the present invention correspond to the formula

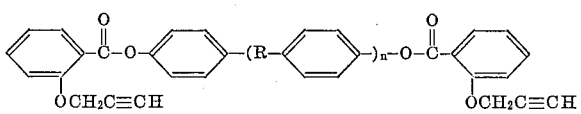

In this and succeeding formulae, R represents lower alkylidene and n represents one of the integers 0 or 1. In the present specification and claims "lower alkylidene" designates an alkylidene group of from 1 to 3 carbon atoms, inclusive. The compounds of the present invention are liquid materials somewhat soluble in many common organic solvents and of low solubility in water. The compounds have been found useful for the killing and control of various insect, bacterial, fungal and plant organisms such as mites, crabgrass, tomato and pea.

The novel compounds of the present invention are prepared by reacting a propargyl halide with an alkali metal salt of a hydroquinone disalicylate or an alkali metal salt of alkylidene di-p-phenylene disalicylate corresponding to the formula

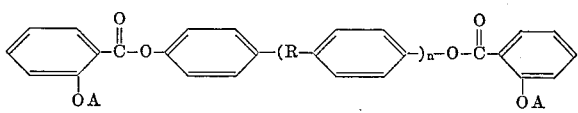

wherein A represents an alkali metal. It is preferable to carry out the reaction in the presence of an organic liquid reaction medium such as isopropanol, acetone, and methyl ethyl ketone. The reaction takes place smoothly at temperatures at which halide of reaction is formed and preferably from about 0 to 100° C. The halide of reaction appears in the reaction medium as the halide salt of the alkali metal in the starting material. Good results are obtained when one molceular proportion of hydroquinone disalicylate alkali metal salt or alkylidene di-p-phenylene disalicylate alkali metal salt is combined with at least one molecular proportion of propargyl halide. The reaction consumes two moles of propargyl halide for each mole of disalicylate alkali metal salt employed. For optimum yields, the use of starting materials in amounts which represent such proportions is preferred. Upon completion of the reaction, the desired product can be separated and purified by conventional procedures.

In carrying out the reaction, the alkali metal salt of the disalicylate, propargyl halide and reaction medium, if employed, can be combined in any convenient fashion. The resulting mixture is maintained, for a period of time, at a temperature at which halide of reaction is formed, to insure completion of the reaction. A substantial cessation in the production of the halide of reaction indicates that the reaction is nearing completion. The halide of reaction can be removed from the reaction mixture by such conventional procedures as filtration or washing with water, and the resulting product employed as the toxic constituent, in pesticidal applications. If a product of greater purity is desired, the reaction mixture can be concentrated by heating under reduced pressure to remove the low boiling constituents.

In preparing the compounds of the present invention, it has been found to be unnecessary to isolate the disalicylate alkali metal salts which are to be employed as starting materials. In a preferred procedure, the disalicylate alkali metal salts are produced in situ in the reaction mixture from the reaction of a basic material such as an alakali metal carbonate and a disalicylate compound corresponding to the formula

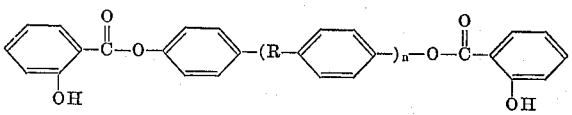

In such embodiment, one molecular proportion of the disalicylate compound is employed with at least one molecular proportion of propargyl halide and at least one molecular proportion of the basic material, and preferably with at least about two molecular proportions of propargyl halide and two molecular proportions of the basic material. The conditions of reaction and method of separation and isolation are all as previously described.

The following examples are merely illustrative and are not to be construed as limiting.

*Example 1.—Hydroquinone bis [o-(2-propynyloxy) benzoate]*

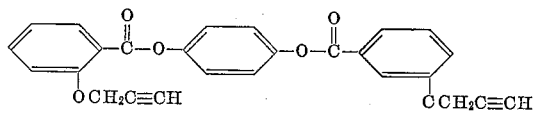

Hydroquinone disalicylate (7 grams), propargyl bromide (12 grams) and potassium carbonate (13 grams) were dispersed in 100 milliliters of acetone. The resulting mixture was heated with stirring at the boiling temperature and under reflux for thirty hours. To the reaction mixture was then added 30 milliliters of water which contained 10 grams of sodium hydroxide. The reaction mixture treated in this manner was then warmed for a short period. Following the heating period, the reaction mixture was diluted with water and the resulting organic layer separated by decantation. This organic layer was heated to remove the low boiling constituents and obtain the hydroquinone bis-[o-(2-propynyloxy)benzoate] product as a liquid residue having a refractive index n/D of 1.5634 at 25° C.

*Example 2.—4,4'-isopropylidene bis-[phenyl o-(2-propynyloxy)benzoate]*

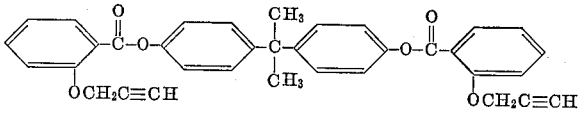

Isopropylidene di-p-phenylene disalicylate (25 grams), propargyl bromide (20 grams) and potassium carbonate (20 grams) were dispersed in 300 milliliters of acetone and the resulting mixture heated for twenty-four hours. The reaction mixture was handled exactly as described in Example 1 to obtain the 4,4'-isopropylidene bis-[phenyl o-(2-propynyloxy)benzoate] product as a liquid residue having a refractive index n/D of 1.5721 at 25° C.

The compounds of the present invention have been found to be useful as pesticides for the control of a number of insect and plant organisms. For such use, the products are dispersed on a finely divided solid and employed as dusts. Also, such mixtures may be dispersed in water with or without the aid of surface active dispersing agents and the resulting aqueous suspensions employed as sprays, drenches or washes. In other procedures, the products are employed as the toxic constituent in solvent solutions, oil-in-water or water-in-oil emulsions or aqueous dispersions. In representative operations, aqueous dispersions containing 4,4'-isopropylidene bis[o-(2-propynyloxy)benzoate], at concentrations of one percent by weight, gave substantially complete controls of two spotted spider mites. In further operations, hydroquinone bis[o-(2-propynyloxy)benzoate], when employed in soil at dosages of 50 pounds per acre, gave substantially complete controls and kills of pea plants.

The alkali metal salts of the alkylidene di-p-phenylene disalicylates employed as starting materials in accordance with the present invention are prepared by esterifying a suitable alkylidene bisphenol with salicyclic acid in the presence of phosphorus oxychloride as catalyst. The alkylidene di-p-phenylene disalicylate is isolated by conventional procedures and allowed to react with an aqueous solution of alkali metal hydroxide in order to form the alkali metal salt of the alkylidene di-p-phenylene disalicylate.

We claim:
1. A compound corresponding to the formula

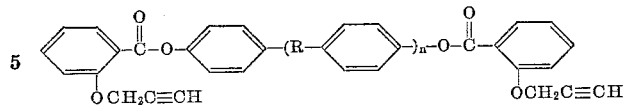

wherein R represents a lower alkylidene and $n$ represents one of the integers 0 or 1.

2. 4,4'-isopropylidene bis[phenyl o-(2-propynyloxy)benzoate].

3. Hydroquinone bis[o-(2-propynyloxy)benzoate].

References Cited by the Examiner

UNITED STATES PATENTS 3,097,230  7/1963  Miller _____ 260—473

LORRAINE A. WEINBERGER, *Primary Examiner.*

S. B. WILLIAMS, *Assistant Examiner.*